United States Patent
Saito et al.

(10) Patent No.: US 12,032,625 B2
(45) Date of Patent: Jul. 9, 2024

(54) DISPLAY CONTROL APPARATUS, DISPLAY CONTROL METHOD, AND COMPUTER PROGRAM PRODUCT

(71) Applicant: KABUSHIKI KAISHA TOSHIBA, Tokyo (JP)

(72) Inventors: Hiroo Saito, Kawasaki (JP); Yuto Yamaji, Kawasaki (JP); Osamu Yamaguchi, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 139 days.

(21) Appl. No.: 17/179,709

(22) Filed: Feb. 19, 2021

(65) Prior Publication Data
US 2021/0311984 A1 Oct. 7, 2021

(30) Foreign Application Priority Data
Apr. 1, 2020 (JP) .................. 2020-065924

(51) Int. Cl.
*G06F 16/58* (2019.01)
*G06F 16/55* (2019.01)
(Continued)

(52) U.S. Cl.
CPC ............ *G06F 16/55* (2019.01); *G06F 16/583* (2019.01); *G06F 18/22* (2023.01); *G06F 18/231* (2023.01);
(Continued)

(58) Field of Classification Search
CPC ........ G06F 16/55; G06F 16/583; G06V 40/10
(Continued)

(56) References Cited

U.S. PATENT DOCUMENTS

| 2009/0316962 A1* | 12/2009 | Sun ...................... G06V 40/175 382/118 |
| 2012/0039514 A1* | 2/2012 | Sun ...................... G06V 40/172 382/118 |

(Continued)

FOREIGN PATENT DOCUMENTS

| JP | 10-162020 A | 6/1998 |
| JP | 4577410 B2 | 11/2010 |

(Continued)

OTHER PUBLICATIONS

Wang, Q et al., "Speaker Diarization With Lstm," arXiv: 1710.10468v6 [eess.AS], Dec. 14, 2018, 5 pages.

*Primary Examiner* — Hosain T Alam
*Assistant Examiner* — Tracy M McGhee
(74) *Attorney, Agent, or Firm* — Oblon, McClelland, Maier & Neustadt, L.L.P.

(57) ABSTRACT

According to an embodiment, a display control apparatus includes a clustering unit, a sub-clustering unit, and a display control unit. The clustering unit is configured to classify images into a plurality of clusters based on similarity degrees of the images and a first threshold. The sub-clustering unit is configured to further classify images within each of the plurality of clusters into a plurality of sub-clusters based on the similarity degrees and a second threshold that is higher than the first threshold. The display control unit is configured to display, on a display unit, display information including a cluster representative indicative of a representative of images included in a cluster and a sub-cluster representative indicative of a representative of an image included in a sub-cluster.

15 Claims, 11 Drawing Sheets

(51) Int. Cl.
  *G06F 16/583*    (2019.01)
  *G06F 18/22*     (2023.01)
  *G06F 18/231*    (2023.01)
  *G06F 18/2431*   (2023.01)
  *G06V 10/74*     (2022.01)
  *G06V 10/762*    (2022.01)
  *G06V 40/10*     (2022.01)
  *G06V 40/16*     (2022.01)

(52) U.S. Cl.
  CPC ........ *G06F 18/2431* (2023.01); *G06V 10/761* (2022.01); *G06V 10/7625* (2022.01); *G06V 40/10* (2022.01); *G06V 40/172* (2022.01)

(58) Field of Classification Search
  USPC .......................................................... 707/736
  See application file for complete search history.

(56) References Cited

U.S. PATENT DOCUMENTS

| | | | | |
|---|---|---|---|---|
| 2012/0078977 | A1* | 3/2012 | Shibata | H04N 21/8549 |
| | | | | 707/E17.044 |
| 2013/0236072 | A1* | 9/2013 | Sun | G06V 40/175 |
| | | | | 382/118 |
| 2015/0356129 | A1* | 12/2015 | Liu | G06F 16/2246 |
| | | | | 707/741 |

FOREIGN PATENT DOCUMENTS

| | | | |
|---|---|---|---|
| JP | 2014-16786 A | | 1/2014 |
| JP | 2014186580 A1 | * | 1/2014 |
| JP | 2012-74759 A | | 4/2014 |
| JP | 2014-186580 A | | 10/2014 |
| WO | WO 2014/109127 A1 | | 7/2014 |

* cited by examiner

FIG.8

| CLUSTER REPRESENTATIVE | SUB-CLUSTER REPRESENTATIVE | IMAGE IN SUB-CLUSTER (THE NUMBER OF IMAGES DISPLAYED = 3) |
|---|---|---|
| CLUSTER ID = 1 NAME = SO-AND-SO | ID=1, SIMILARITY DEGREE 0.95 | SUB-CLUSTER ID = 1 |
| | ID=2, SIMILARITY DEGREE 0.8 | SUB-CLUSTER ID = 2 |
| | ID=3, SIMILARITY DEGREE 0.9 ⋮ | SUB-CLUSTER ID = 3 |

211

DISPLAY CONTROL APPARATUS, DISPLAY CONTROL METHOD, AND COMPUTER PROGRAM PRODUCT

CROSS-REFERENCE TO RELATED APPLICATIONS

This application is based upon and claims the benefit of priority from Japanese Patent Application No. 2020-065924, filed on Apr. 1, 2020; the entire contents of which are incorporated herein by reference.

FIELD

Embodiments described herein relate generally to a display control apparatus, a display control method, and a computer program product.

BACKGROUND

A known clustering technique classifies data into categories. For example, face image data included in surveillance images can be classified into clusters of individuals to facilitate visual tracking of a passing person.

BRIEF DESCRIPTION OF DRAWINGS

FIG. 8 is a diagram illustrating example display information after the correction according to the second embodiment;

DETAILED DESCRIPTION

According to an embodiment, a display control apparatus includes a clustering unit, a sub-clustering unit, and a display control unit. The clustering unit is configured to classify images into a plurality of clusters based on similarity degrees of the images and a first threshold. The sub-clustering unit is configured to further classify images within each of the plurality of clusters into a plurality of sub-clusters based on the similarity degrees and a second threshold that is higher than the first threshold. The display control unit is configured to display, on a display unit, display information including a cluster representative indicative of a representative of images included in a cluster and a sub-cluster representative indicative of a representative of an image included in a sub-cluster.

Some embodiments of a display control apparatus, a display control method, and a computer program are described in detail below with reference to the accompanying drawings.

First Embodiment

An example functional configuration of a display control apparatus according to a first embodiment is described below. While the first embodiment describes calculation of feature quantities for facial detection and identification of individuals in face image recognition, the description is applicable to use of feature quantities for identification of individuals based on human body detection.

Example of Functional Configuration

Figure 1:
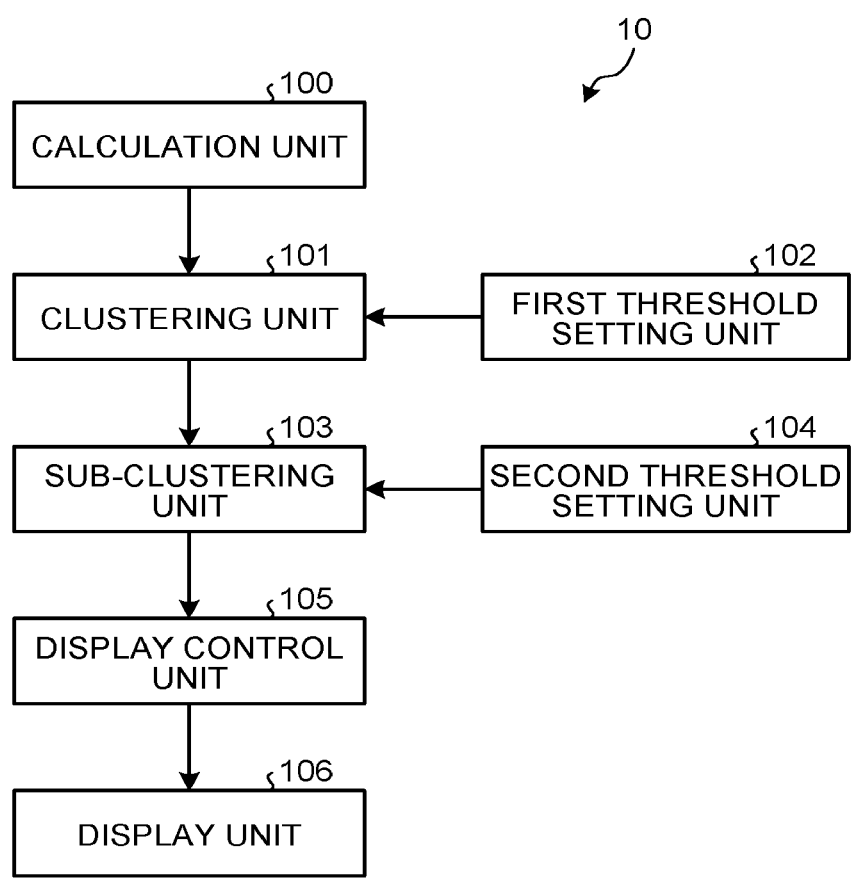
FIG. 1 is a diagram illustrating an example functional configuration of a display control apparatus according to a first embodiment.

FIG. 1 is a diagram illustrating an example functional configuration of a display control apparatus 10 according to the first embodiment. The display control apparatus 10 according to the first embodiment includes a calculation unit 100, a clustering unit 101, a first threshold setting unit 102, a sub-clustering unit 103, a second threshold setting unit 104, a display control unit 105, and a display unit 106.

The calculation unit 100 calculates similarity degrees between images. Specifically, the calculation unit 100 converts, for example, an image into a feature quantity indicative of a feature of the image and calculates a similarity degree based on the Euclidean distance or Cosine similarity degree of the feature quantity.

The clustering unit 101 classifies images into a plurality of clusters (classes) based on the similarity degrees of the images and a first threshold. For example, the clustering unit 101 classifies an image to be classified into a class if a similarity degree between an average (for example, a mean vector) of feature quantities of images (for example, feature vectors) included in the class and a feature quantity of the image to be classified exceeds the first threshold. Images with a higher similarity degree are more likely to be in the same class, and images with a lower similarity degree are more likely to be in different classes. In the first embodiment, classification of images containing persons is described.

The first threshold setting unit 102 sets the first threshold used for the classification processing performed by the clustering unit 101. The first threshold setting unit 102, for example, uses data containing given images and classes and determines the first threshold based on the similarity degrees between images within the same class and the similarity degrees between images in different classes.

The sub-clustering unit 103 further classifies images within a cluster into a plurality of sub-clusters based on the similarity degrees described above and a second threshold that is higher than the first threshold. Very similar data can thus be grouped together within each cluster, which enables a group of data to be selected from diverse data contained in a category (cluster) for display.

The second threshold setting unit 104 sets the second threshold used for the classification processing performed by the sub-clustering unit 103. The second threshold can be determined from, for example, data containing correct outputs (data of images and their associated classes). The sub-clustering unit 103 serves a purpose of classifying images within a class (cluster). The second threshold setting unit 104 thus sets the second threshold higher than the first threshold used for the classification of images into different classes by the clustering unit 101.

The second threshold may be adjusted, for example, based on a result of classification displayed by the display control unit 105 on the display unit 106. The second threshold setting unit 104 then receives from the user a second threshold adjusted based on the result of classification and sets the second threshold in the sub-clustering unit 103. The sub-clustering unit 103 then re-executes the processing. As required, the second threshold is reset and the sub-clustering processing is re-performed iteratively.

The display control unit 105 displays, on the display unit 106, display information including, for example, a cluster representative indicative of a representative of images included in a cluster and a sub-cluster representative indicative of a representative of images included in a sub-cluster.

The display unit 106 includes, for example, a liquid crystal display, a touch panel, and the like. The display unit 106 may be included in the display control apparatus 10 or may be implemented as a device external to the display control apparatus 10.

Example Processing of Clustering Unit

Figure 2:
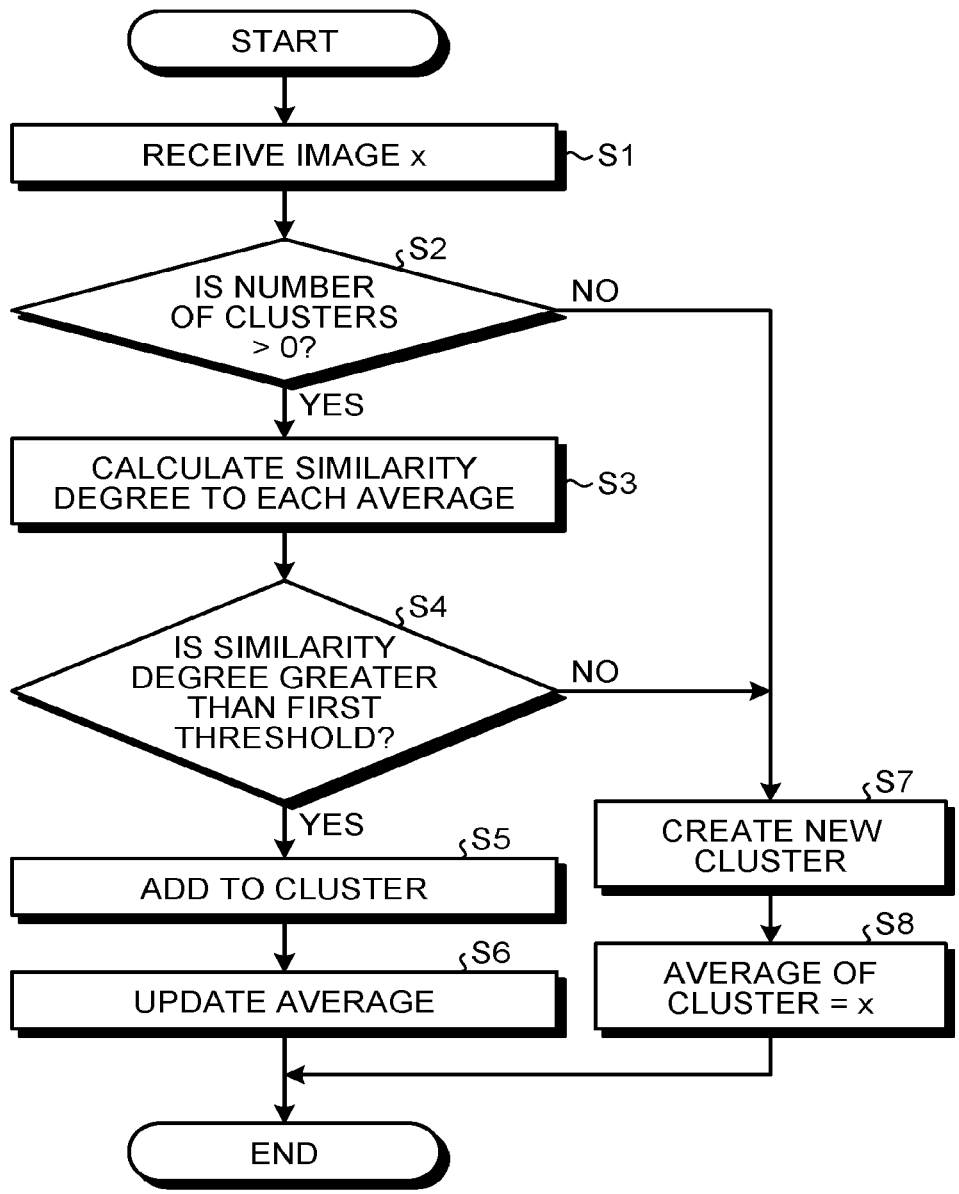
FIG. 2 is a flowchart illustrating example processing of a clustering unit according to the first embodiment.

FIG. 2 is a flowchart illustrating example processing of the clustering unit 101 according to the first embodiment. The clustering unit 101 receives an image x for cluster classification (step S1). Then, the clustering unit 101 determines if the number of clusters is >0 (step S2).

If the number of clusters is >0 (Yes at step S2), the clustering unit 101 calculates a similarity degree between an average of feature quantities of the images included in each cluster and a feature quantity of the image x (step S3).

If the similarity degree is greater than the first threshold (Yes at step S4), the clustering unit 101 adds the image x to the cluster (step S5) and updates the average of the cluster (step S6). Specifically, the clustering unit 101 manages a mean m (c) and the number of data items n (c) for each cluster c. If the similarity degree between a mean m (c) and the image x exceeds the first threshold, the clustering unit 101 determines that the image x belongs in the cluster c. When the image x is added, the data of each cluster may be updated with, for example, m (c)=(n (c) m (c)+x)/(n (c)+1), n(c)=n (c)+1. The initial values of the mean m(c) and the number of data items n(c) are both 0.

If the inequality, the number of clusters >0, does not hold (Yes at step S2), or if the similarity degree is equal to or less than the first threshold (No at step S4), the clustering unit 101 creates a new cluster that includes the image x (step S7) and uses the feature quantities of the image x as the average of this new cluster (step S8).

Example Processing of Sub-Clustering Unit

Figure 3:
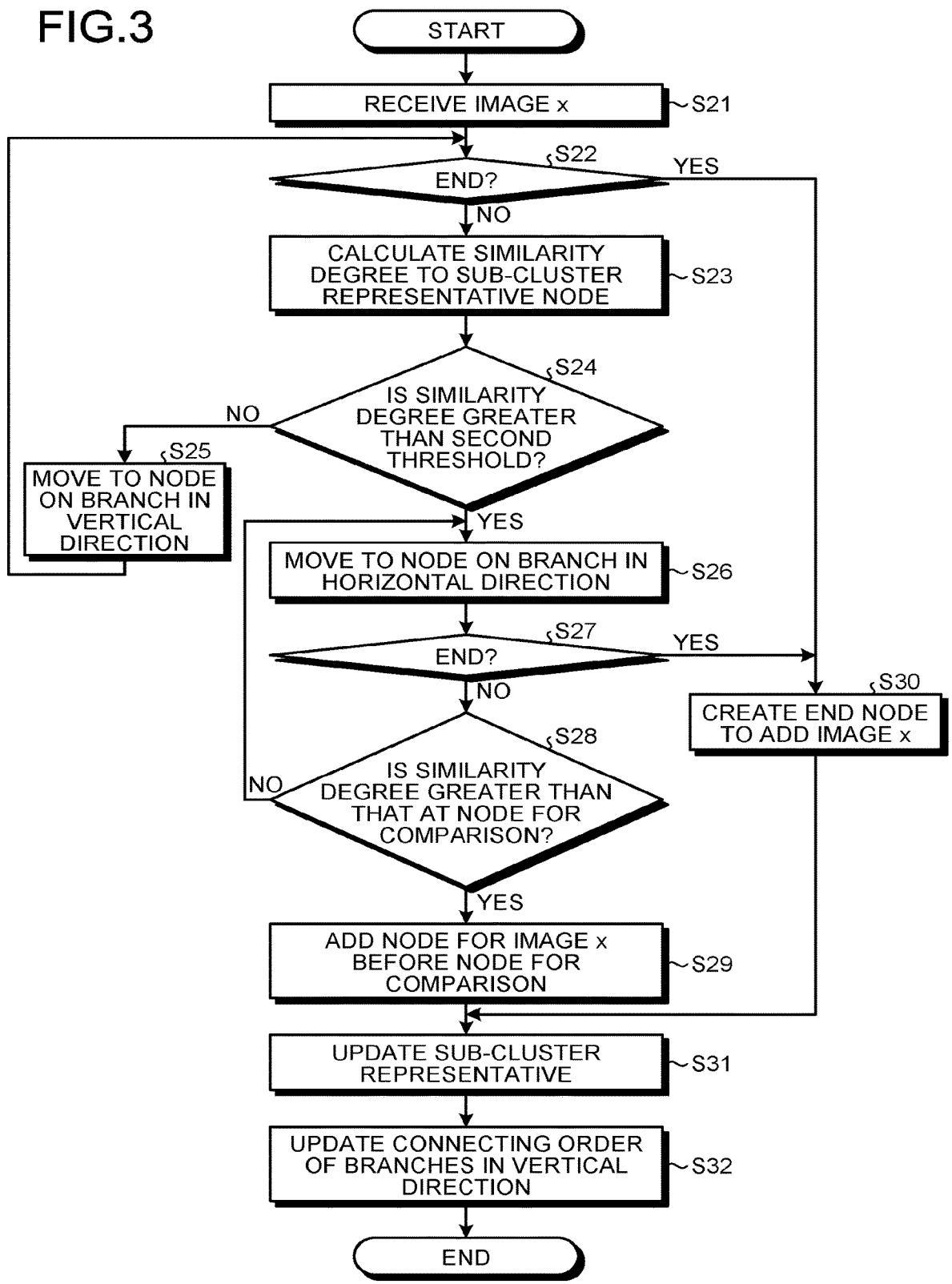
FIG. 3 is a flowchart illustrating example processing of a sub-clustering unit according to the first embodiment.
Figures 4, 5:
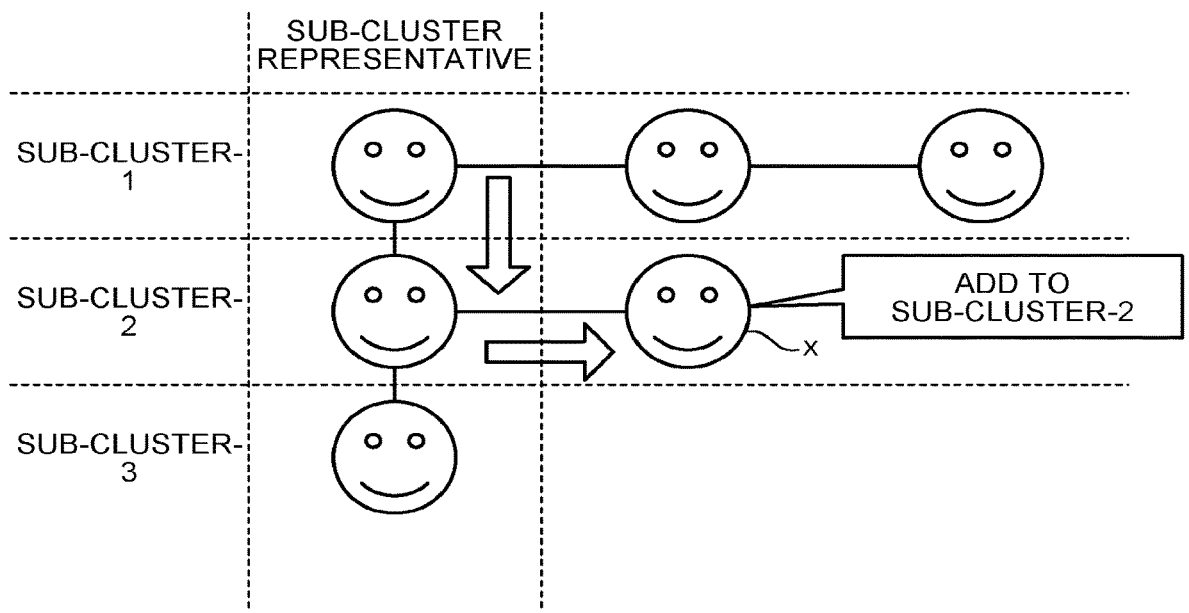
FIG. 4 is a diagram illustrating an example data structure of a plurality of images classified into sub-clusters.
FIG. 5 is a diagram illustrating example display information according to the first embodiment.

FIG. 3 is a flowchart illustrating example processing of the sub-clustering unit 103 according to the first embodiment. FIG. 4 is a diagram illustrating an example data structure of a plurality of images classified into sub-clusters. As illustrated in FIG. 4, the images classified into sub-clusters have a tree structure. Nodes included in the tree are connected together by branches that extend either in a vertical direction (first direction) or in a horizontal direction (second direction). The processing described by the flowchart in FIG. 3 develops a tree in which images with similarity degrees greater than the second threshold are connected together by branches extending in the horizontal direction. This causes images with higher similarity degrees with one another to gather on the same level (nodes placed in the horizontal direction in FIG. 4).

The sub-clustering unit 103 starts the processing to add an image x at the position where the root of the tree is located (in the example illustrated in FIG. 4, the node in which the sub-cluster representative of a sub-cluster-1 is stored).

The sub-clustering unit 103 receives an image x for sub-cluster classification (step S21). Then, the sub-clustering unit 103 determines whether it is at an end of the tree (step S22). If it is at an end of the tree (Yes at step S22), the flowchart proceeds to step S30.

If it is not at an end of the tree (No at step S22), the sub-clustering unit 103 calculates a similarity degree to the sub-cluster representative node (step S23). The sub-clustering unit 103 then determines whether the similarity degree is greater than the second threshold (step S24).

If the similarity degree is equal to or less than the second threshold (No at step S24), the comparison target is moved to a node on the branch extending in the vertical direction (step S25). In other words, if the similarity degree between a new image to be classified and a sub-cluster representative does not exceed the second threshold, the sub-clustering unit 103 does not calculate similarity degrees between the images in the same sub-cluster and the new image. Redundant similarity degree calculation can thus be reduced, which speeds up the processing to add (classify) the image x. After step S25 is performed, the flowchart reverts to step S22.

If the similarity degree is greater than the second threshold (Yes at step S24), the comparison target is moved to a node on the branch extending in the horizontal direction (step S26). Then, the sub-clustering unit 103 determines whether the node for comparison is at an end of the tree (step S27). If the node for comparison is at an end of the tree (Yes at step S27), the flowchart proceeds to step S30.

If the image x is not at an end of the tree (No at step S27), the sub-clustering unit 103 determines whether the similarity degree calculated in step S23 is greater than a similarity degree between the sub-cluster representative and the image at a node for comparison (step S28). If the similarity degree calculated in step S23 is equal to or less than the similarity degree between the sub-cluster representative and the image at the node for comparison (No at step S28), the flowchart reverts to step S26. If the similarity degree calculated in step S23 is greater than the similarity degree between the sub-cluster representative and the image at the node for comparison (Yes at step S28), the sub-clustering unit 103 creates a node that stores the image x therein and places this node before the node for comparison to thereby add the image x to the tree (step S29). The flowchart proceeds to step S31.

If the node for comparison is at an end of the tree (Yes at steps S22 and S27), the sub-clustering unit 103 creates a end node that stores the image x therein to thereby add the image x to the tree (step S30).

Then, the sub-clustering unit 103 updates the sub-cluster representative of the sub-cluster in which the image x has been added (step S31). For example, the sub-clustering unit 103 updates an average of the sub-cluster in which the image x has been added and selects an image that is closest to the average as the sub-cluster representative of the sub-cluster.

Then, the sub-clustering unit 103 re-arranges the connecting order of the branches that extend in the vertical direction (the branches that connect the sub-cluster representatives)

such that the sub-cluster representatives are placed in the descending order of similarity degrees to the cluster representative of the cluster that includes the sub-clusters (step S32).

The processing of the flowchart in FIG. 3 described above creates a tree structure in which the sub-cluster representative with the highest similarity degree to the cluster representative serves as a root, sub-cluster representatives are connected together in the vertical direction (the first direction) in the descending order of similarity degrees to the cluster representative, and images in each sub-cluster are connected together in the horizontal direction (the second direction) in the descending order of similarity degrees to the sub-cluster representative.

Note that the flowchart in FIG. 3 is an example, and another method may be used to create a tree structure that stores a plurality of images as classified into sub-clusters within a cluster.

Example of Display Information

FIG. 5 is a diagram illustrating example display information according to the first embodiment. As illustrated in FIG. 5, display information including, for each cluster obtained by the clustering unit 101, a cluster representative, sub-cluster representatives, and images within the sub-clusters is displayed on the display unit 106.

By the display control unit 105 displaying the sub-cluster representatives in the descending order of similarity degrees to the cluster representative, the data can be visually checked in the descending order of similarity degrees to an average image (the image indicating the cluster representative). Further, by the display control unit 105 displaying a predefined number of images within a sub-cluster in the descending order of similarity degrees to the sub-cluster representative, the images included in the sub-cluster can be checked for a tendency. By displaying the images of the sub-cluster representatives and images within the sub-clusters as illustrated in FIG. 5, a discrepant image (an image with a lower similarity degree to the cluster representative), for example, will be visually discovered with ease.

Additionally, by the display control unit 105 controlling the number of images displayed, the comprehensiveness for checking of images and the efficiency of a checking task can be adjusted. The number of images displayed may be set to zero. In this case, display information including, for each cluster obtained by the clustering unit 101, a cluster representative and sub-cluster representatives is displayed on the display unit 106.

As described above, in the display control apparatus 10 according to the first embodiment, the clustering unit 101 classifies images into a plurality of clusters based on the similarity degrees of the images and a first threshold. The sub-clustering unit 103 further classifies images within a cluster into a plurality of sub-clusters based on the similarity degrees and a second threshold that is higher than the first threshold. The display control unit 105 displays, on the display unit 106, the display information including a cluster representative indicative of a representative of images included in a cluster and a sub-cluster representative indicative of a representative of images included in a sub-cluster.

Therefore, the display control apparatus 10 according to the first embodiment can enable determination of not only similarity relations between categories (clusters) but also relations between images within a category with ease. Specifically, for example, in the case of facial images, even in the same category, that is, in a set of data of facial images of a certain individual, there are differences such as orientations of the face, facial expressions, and the presence or absence of wearable items such as facial masks and sunglasses. By classifying the images into sub-clusters each including similar images and referring to the sub-cluster representatives of the sub-clusters, facial images having many different conditions can be obtained while excluding redundant facial images.

Second Embodiment

A second embodiment is described below. In the description of the second embodiment below, differences from the first embodiment will be explained with explanation similar to that of the first embodiment omitted. In the second embodiment, an example is described in which redundant human images are grouped together by processing of a sub-clustering unit 103 and human images in a video are integrated. While the second embodiment describes calculation of a feature quantity for facial detection and identification of individuals in face image recognition, the description is applicable to use of feature quantities for identification of individuals based on human body detection.

Example of Functional Configuration

Figure 6:
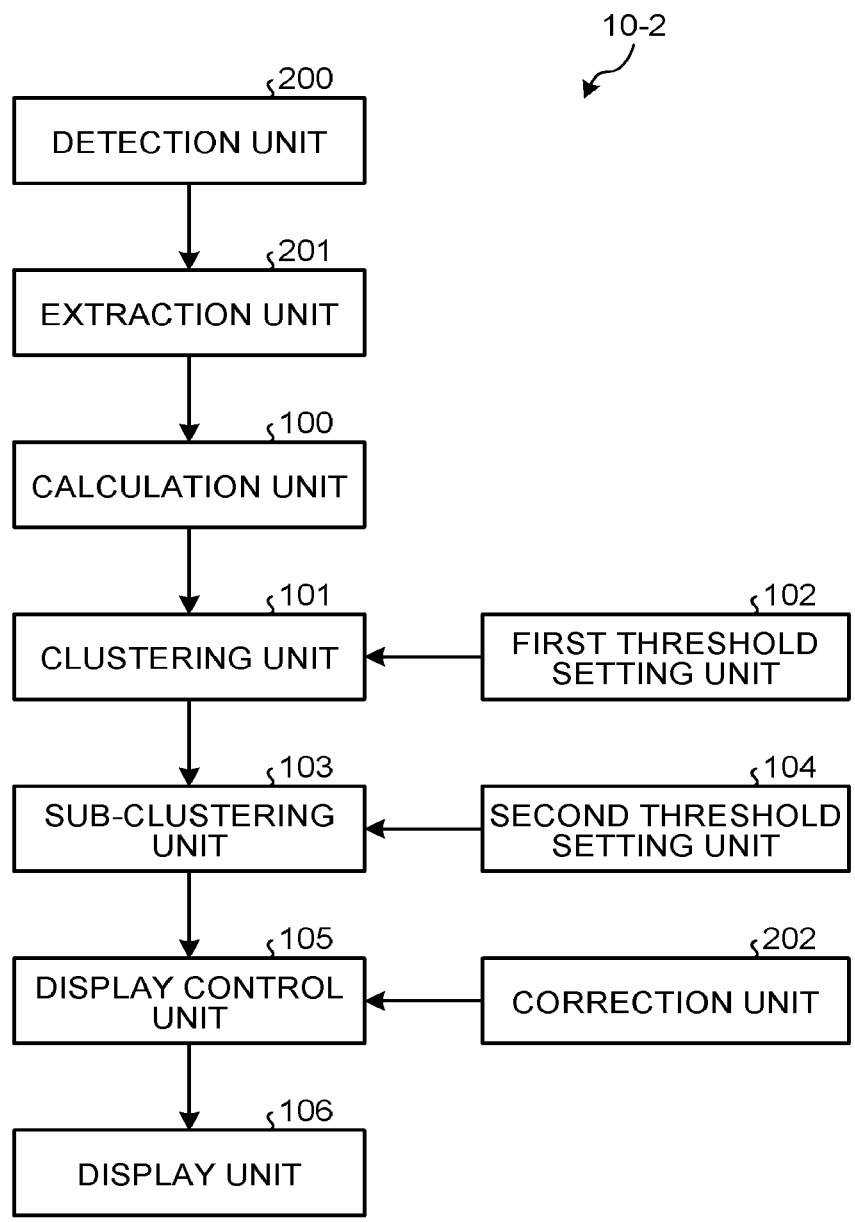
FIG. 6 is a diagram illustrating an example functional configuration of a display control apparatus according to a second embodiment.

FIG. 6 is a diagram illustrating an example functional configuration of a display control apparatus 10-2 according to the second embodiment. The display control apparatus 10-2 according to the second embodiment includes a calculation unit 100, a clustering unit 101, a first threshold setting unit 102, a sub-clustering unit 103, a second threshold setting unit 104, a display control unit 105, a display unit 106, a detection unit 200, an extraction unit 201, and a correction unit 202. In the second embodiment, the detection unit 200, the extraction unit 201, and the correction unit 202 are added to the configuration of the first embodiment.

The detection unit 200 detects a face from an image. The extraction unit 201 extracts feature a quantity indicative of a feature of the face detected by the detection unit 200.

The correction unit 202 deletes one or more images selected from the display information or changes a cluster or a sub-cluster that includes one or more images selected from the display information.

Example of Display Information

Figure 7:
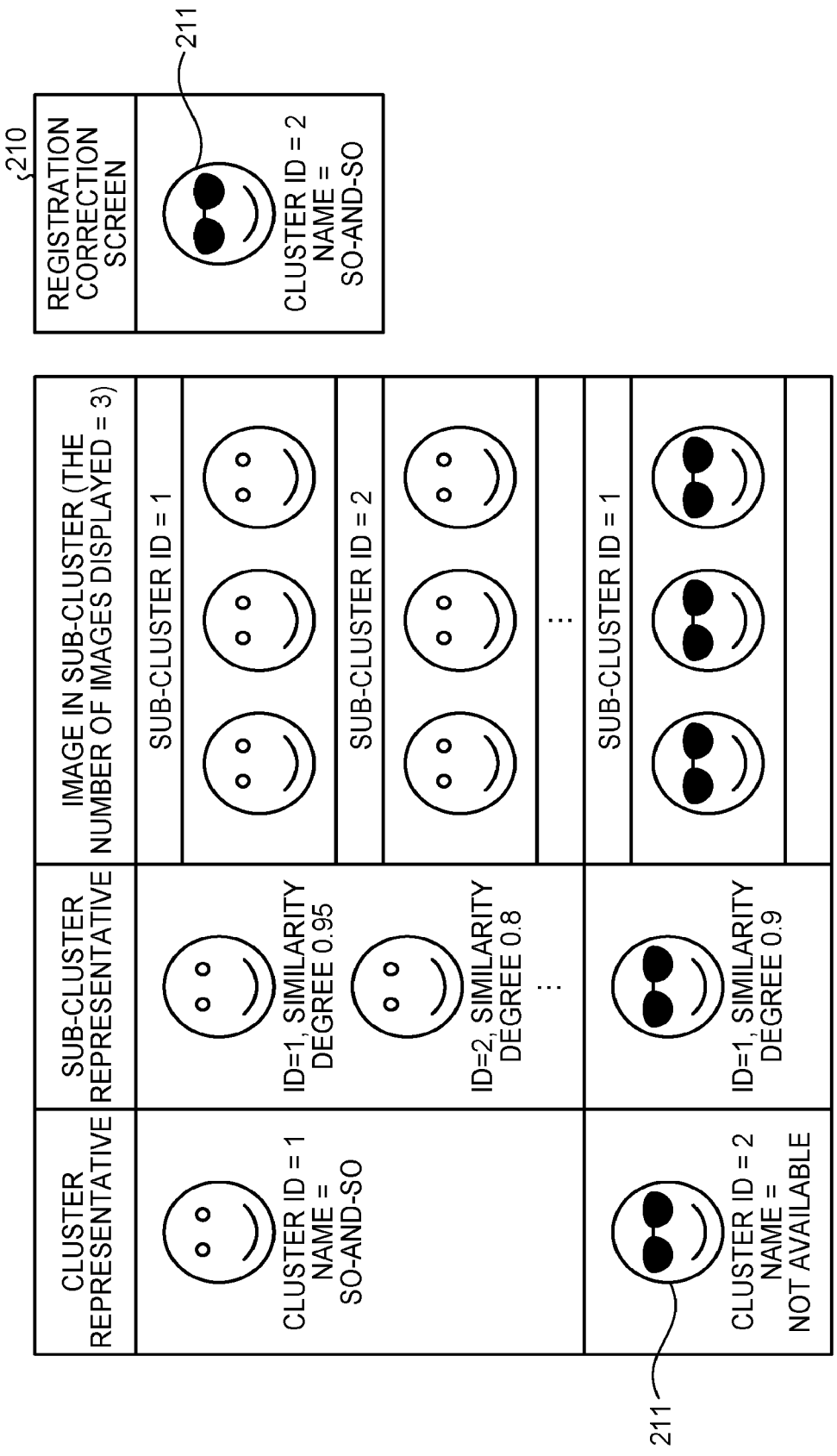
FIG. 7 is a diagram illustrating example display information before correction according to the second embodiment.

FIG. 7 is a diagram illustrating example display information before correction according to the second embodiment. In the second embodiment, a registration correction screen 210 is added. The display information in FIG. 7 includes a cluster with a cluster ID=1 and a cluster with a cluster ID=2. If a person wears sunglasses or the like as in the example illustrated in FIG. 7, an error may occur where the person is classified into different clusters (misclassification). In preparation for such cases, the display information includes the registration correction screen 210, so that a user can correct a result of classification as appropriate. In the example illustrated in FIG. 7, selection of an image 211 and setting of the name So-and-so for the image 211 are received in the registration correction screen 210.

FIG. 8 is a diagram illustrating example display information after the correction according to the second embodiment. In the example illustrated in FIG. 8, the cluster with the cluster ID=2 including the cluster representative image 211 has been changed to a sub-cluster of the cluster with the cluster ID=1. When the selection of the image 211 and setting of the name So-and-so for the image 211 are received in the registration correction screen 210 in FIG. 7, the correction unit 202 integrates, into the cluster with the cluster ID=1 including the name So-and-so, the cluster with the cluster ID=2 including the cluster representative image 211 as a sub-cluster (ID=3) of the cluster with the cluster ID=1.

When the correction unit 202 makes integration of clusters, there is no need to update the average of the resultant cluster (the image indicating its cluster representative) because the similarity degrees between the added images and images included in the cluster into which the integration is made is lower than the similarity degrees between the images within the cluster into which the integration is made. By treating the added image as a discrepant value and not updating the average of images using the discrepant value, enhanced appropriateness can be provided for clustering of images.

Additionally, for example, in an error case reverse to the example illustrated in FIG. 7, where a cluster of a person includes another person (misclassification), a user can check the display information displayed on the display unit 106 and correct the result of classification from the registration correction screen 210. The correction unit 202 correctly classifies the other person into another cluster in response to an input from the registration correction screen 210. In this way, for example, failure of detection can be prevented when the result of classification is searched for the other person in an image.

Modification of Second Embodiment

A modification of the second embodiment is described below. In the description of the modification below, differences from the second embodiment will be explained with explanation similar to that of the second embodiment omitted. In the modification, cases are described in which display information displayed by the display control unit 105 is used for a person search DB (database).

Example of Functional Configuration

Figure 9:
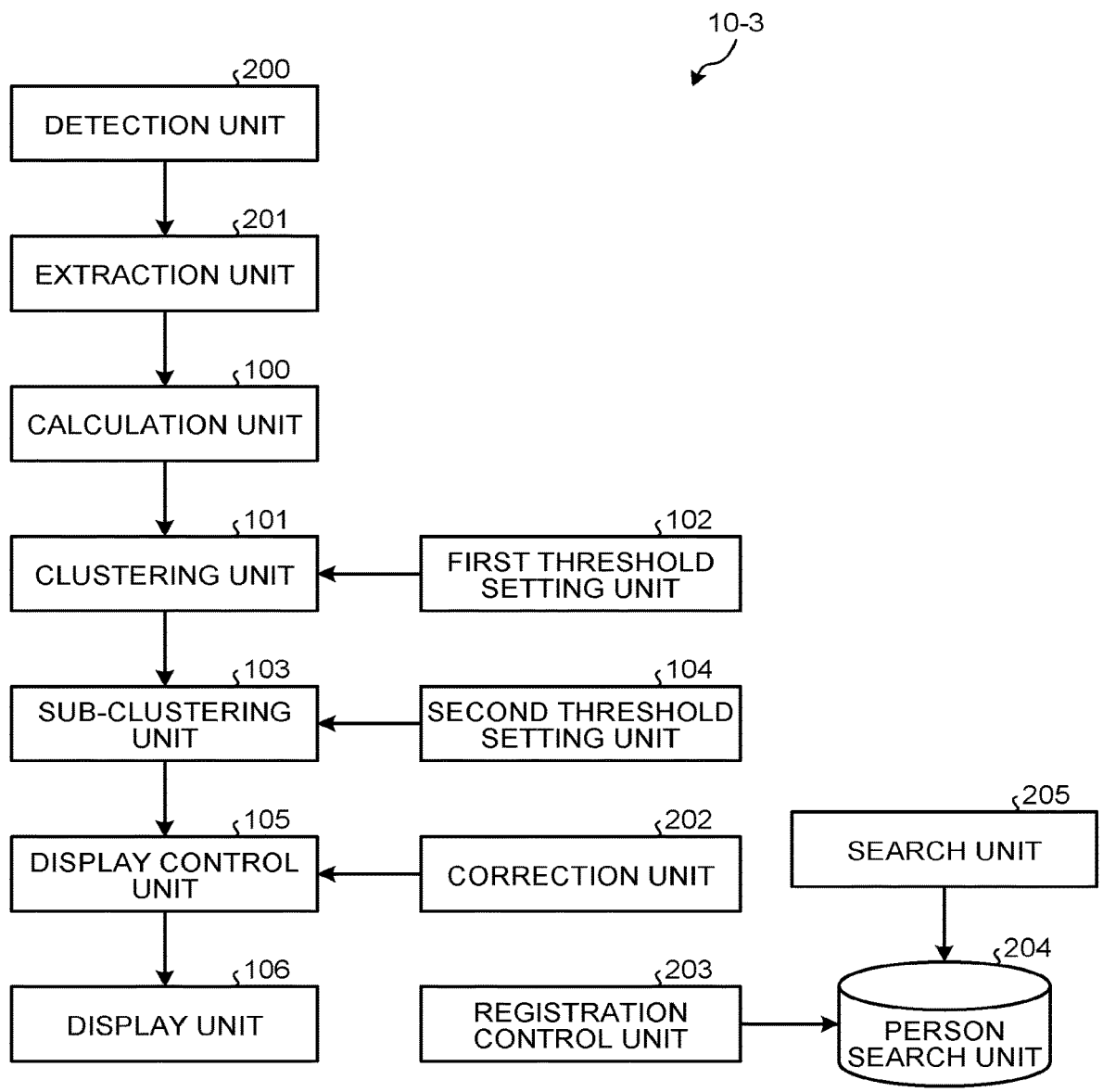
FIG. 9 is a diagram illustrating an example functional configuration of a display control apparatus according to a modification of the second embodiment.

FIG. 9 is a diagram illustrating an example functional configuration of a display control apparatus 10-3 according to the modification of the second embodiment. The display control apparatus 10-3 according to the modification includes a calculation unit 100, a clustering unit 101, a first threshold setting unit 102, a sub-clustering unit 103, a second threshold setting unit 104, a display control unit 105, a display unit 106, a detection unit 200, an extraction unit 201, a correction unit 202, a registration control unit 203, a person search DB 204, and a search unit 205. In the modification, the registration control unit 203, the person search DB 204, and the search unit 205 are added to the configuration of the second embodiment.

The clustering unit 101 and the sub-clustering unit 103 perform clustering processing and sub-clustering processing on existing images and determine cluster representatives and sub-cluster representatives, respectively.

The display control unit 105 displays, on the display unit 106, display information presenting sub-cluster representatives for a user.

The registration control unit 203 registers in the person search DB 204 one or more images selected from the display information displayed by the display control unit 105. The one or more images are registered together with respective IDs and additional information (attribute information). An image to be registered in the person search DB 204 can thus be selected from the display information obtained by sub-clustering. This facilitates selecting an appropriate image for the search of a person from images with various differences within the same class (cluster), whereby enhanced search accuracy can be expected.

The person search DB 204 stores therein, for example, an image, an ID, and additional information associated with one another. An image is, for example, a human image including the face. An ID is information for identifying the image. Additional information includes, for example, sex, age, race, expressions, the presence of wearable items such as eyeglasses, hairstyle, and clothing.

The search unit 205 searches the person search DB 204 for a person included in an image captured by a surveillance camera or the like. For example, the search unit 205 searches the person search DB 204 for a person based on similarity degrees between the person included in the captured image and persons included in images in the person search DB 204.

Figure 10:
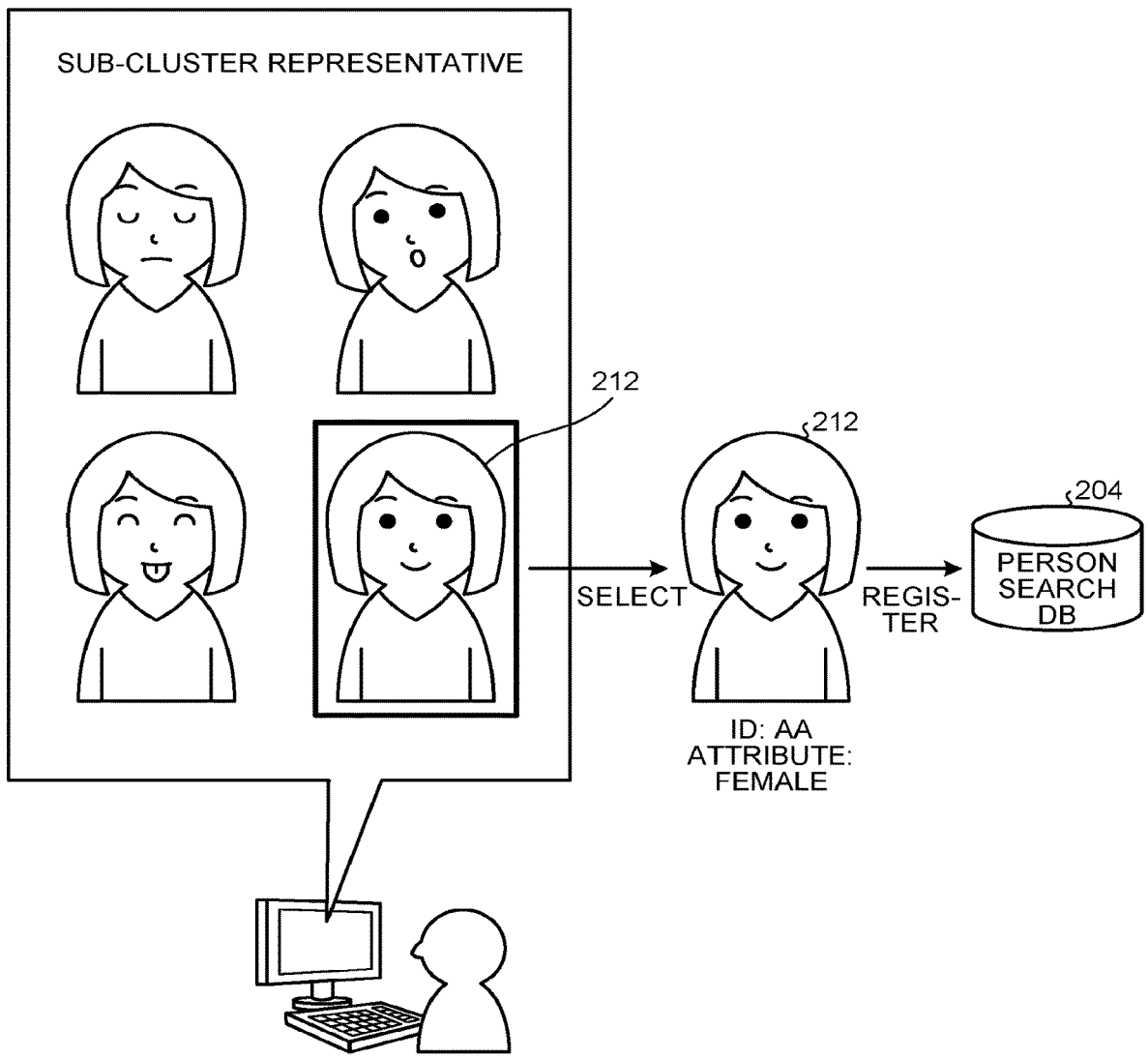
FIG. 10 is a diagram for describing an operation of a registration control unit according to the modification of the second embodiment.

FIG. 10 is a diagram for describing an operation of the registration control unit 203 according to the modification of the second embodiment. In an example illustrated in FIG. 10, display information including four images indicative of sub-cluster representatives is displayed by the display control unit 105. In the example illustrated in FIG. 10, an image 212 is selected from the display information and registered by the registration control unit 203 in the person search DB 204.

Figure 11:
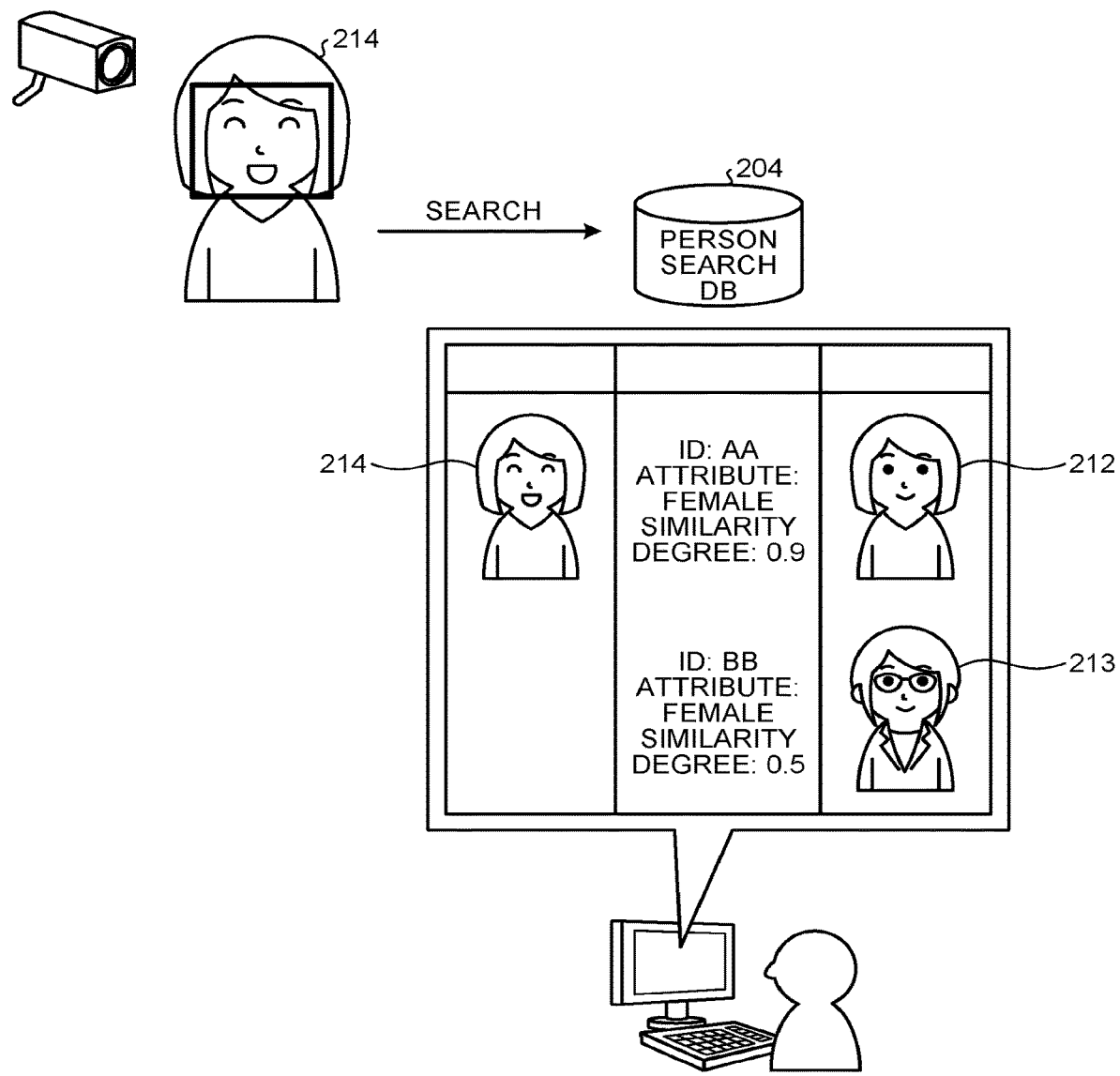
FIG. 11 is a diagram for describing an operation of a search unit according to the modification of the second embodiment.

FIG. 11 is a diagram for describing an operation of the search unit according to the modification of the second embodiment. An example in FIG. 11 illustrates a case where the search unit 205 searches the person search DB 204 for an image similar to an image including a person 214 captured by a surveillance camera. In the example illustrated in FIG. 11, the display control unit 105 displays, a result of the search, images 212 and 213 in the descending order of similarity degrees to the person 214.

Figure 12:
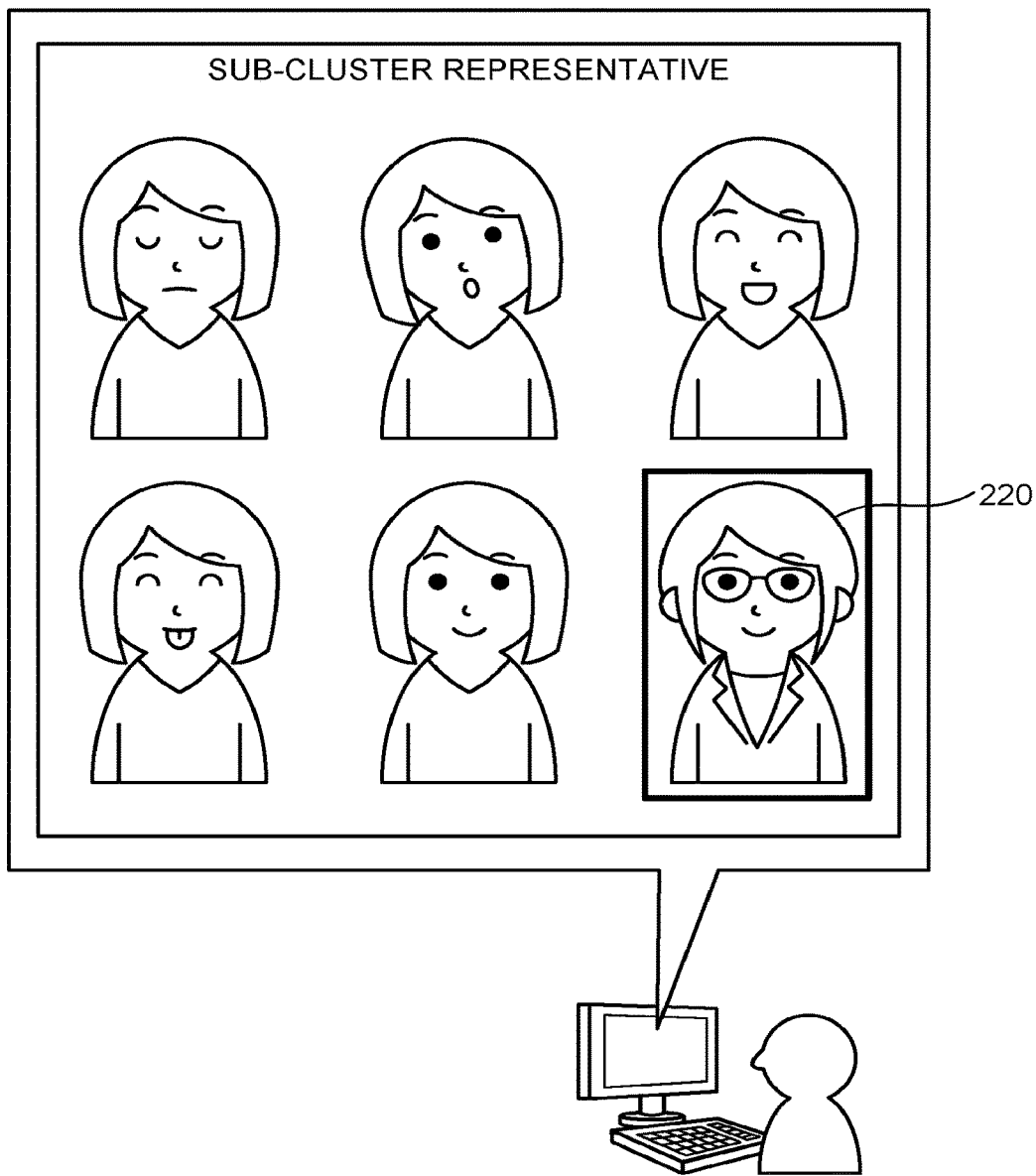
FIG. 12 is a diagram illustrating example display information according to the modification of the second embodiment.

FIG. 12 is a diagram illustrating example display information according to the modification of the second embodiment. In FIG. 12, the example display information indicates sub-cluster representatives. If the images indicative of the sub-cluster representatives include an image of another person (an image 220 in FIG. 12), the image of the other person can be selected and corrected in the registration correction screen 210 described above, so that the other person is classified in another cluster.

An example hardware configuration of the display control apparatus 10 according to the first and the second embodiments is described below.

Example of Hardware Configuration

Figure 13:
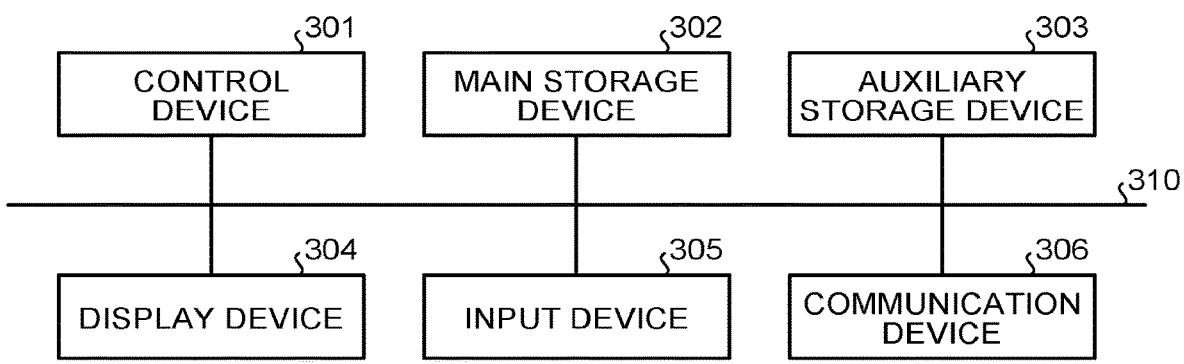
FIG. 13 is a diagram illustrating an example hardware configuration of the display control apparatus according to the first and the second embodiments.

FIG. 13 is a diagram illustrating an example hardware configuration of the display control apparatus 10 according to the first and the second embodiments.

The display control apparatus 10 includes a control device 301, a main storage device 302, an auxiliary storage device 303, a display device 304, an input device 305, and a communication device 306. The control device 301, the main storage device 302, the auxiliary storage device 303, the display device 304, the input device 305, and the communication device 306 are connected via a bus 310.

The control device 301 executes a computer program read from the auxiliary storage device 303 to the main storage device 302. The main storage device 302 is a memory, such as a read only memory (ROM), a random access memory (RAM), and the like. The auxiliary storage device 303 includes a hard disk drive (HDD), a solid state drive (SSD), a memory card, and the like.

The display device 304 displays display information. The display device 304 is, for example, a liquid crystal display or the like. The input device 305 is an interface for operating a computer. The input device 305 includes, for example, a keyboard, a mouse, and the like. If a computer is a smart device such as a smart phone, a tablet terminal, and the like, a touch panel, for example, serves as the display device 304 and the input device 305. The communication device 306 is an interface for communication with other devices.

A computer program executed by the computer is stored in a computer-readable storage medium, such as a CD-ROM, a memory card, a CD-R, and a digital versatile disc (DVD), in a file in an installable format or an executable format and provided as a computer program product.

The computer program executed by the computer may be stored in a computer connected to a network, such as the Internet, and downloaded via the network to be provided. The computer program executed by the computer may be provided via a network, such as the Internet, without being downloaded.

The computer program executed by the computer may be included in a ROM or the like in advance to be provided.

The computer program executed by the computer has a modular configuration that includes a portion of the functional configuration (functional blocks) of the display control apparatus 10 described above, which portion can be also achieved by a computer program. Each of the functional blocks is loaded onto the main storage device 302 when, in terms actual hardware, the control device 301 reads the computer program from the storage medium and executes the computer program. That is, each of the functional blocks described above is generated on the main storage device 302.

Each of the functional blocks described above may be achieved in part or in entirety using hardware such as an integrated circuit (IC), instead of using software.

Furthermore, if the functions are achieved using a plurality of processors, each processor may achieve one of the functions, or two or more of the functions.

A computer that serves as the display control apparatus 10 may have any operational configuration. For example, one computer may serve as the display control apparatus 10. In another example, the display control apparatus 10 may be operated as a cloud system on a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display control apparatus comprising:
a memory; and
one or more hardware processors electrically coupled to the memory and configured to:
classify, based on images received, a similarity degree to an average of images included in a cluster, and a first threshold used for classification by the similarity degree, the images received into a plurality of clusters;
further classify images within each of the plurality of clusters into a plurality of sub-clusters based on the similarity degrees and a second threshold that is higher than the first threshold; and
display, on a display device, display information including a cluster representative indicative of a representative of images included in a cluster and a sub-cluster representative indicative of a representative of an image included in a sub-cluster, wherein the cluster representative is an image that is closest to the average of the images included in the cluster among the images included in the cluster,
the sub-cluster representative is an image that is closest to an average of images included in the sub-cluster among the images included in the sub-cluster,
a plurality of images classified by the hardware processors has a tree structure in which a sub-cluster representative with a highest similarity degree to the cluster representative serves as a root, sub-cluster representatives are connected together in a first direction in descending order of similarity degrees to the cluster representative, and images in a first sub-cluster including a first sub-cluster representative are connected together in a second direction in descending order of similarity degrees to the first sub-cluster representative, and
the hardware processors are configured to, when classifying a new image, not calculate similarity degrees between the images in the first sub-cluster and the new image when a similarity degree between the new image and the first sub-cluster representative does not exceed the second threshold and proceed to calculate a similarity degree between the new image and any next sub-cluster representative in the first direction, and when there are no remaining next sub-cluster representatives in the first direction, create an end node that adds the new image to the tree structure.

2. The apparatus according to claim 1, wherein the hardware processors are configured to display a predefined number of images included in the first sub-cluster in descending order of similarity degrees to the first sub-cluster representative.

3. The apparatus according to claim 1, wherein
the images includes persons,
the hardware processors are configured to classify the images into the plurality of clusters for the respective persons based on the similarity degrees of the persons included in the images and the first threshold, and
the hardware processors are configured to further classify the images into the plurality of sub-clusters based on the similarity degrees of the persons included in the images and the second threshold.

4. The apparatus according to claim 3, wherein the hardware processors are further configured to:
register, in a person search database, one or more images selected from the display information.

5. The apparatus according to claim 1, wherein the hardware processors are further configured to:
delete one or more images selected from the display information or to change a cluster or a sub-cluster that includes one or more images selected from the display information.

6. A display control method comprising:
classifying, by a display control apparatus and based on images received, a similarity degree to an average of images included in a cluster, and a first threshold used for classification by the similarity degree, the images received into a plurality of clusters;
further classifying, by the display control apparatus, images within each of the plurality of clusters into a plurality of sub-clusters based on the similarity degrees and a second threshold that is higher than the first threshold; and
displaying, on a display device by the display control apparatus, display information including a cluster representative indicative of a representative of images included in a cluster and a sub-cluster representative indicative of a representative of an image included in a sub-cluster, wherein the cluster representative is an image that is closest to the average of the images included in the cluster among the images included in the cluster, the sub-cluster representative is an image that is closest to an average of images included in the sub-cluster among the images included in the sub-cluster, a plurality of images classified at the further classifying into the plurality of sub-clusters has a tree structure in which a sub-cluster representative with a highest similarity degree to the cluster representative serves as a root, sub-cluster representatives are connected together in a first direction in descending order of similarity degrees to the cluster representative, and images in a first sub-cluster including a first sub-cluster are connected together in a second direction in descending order of similarity degrees to the first sub-cluster representative, and when classifying a new image at the further classifying into the plurality of sub-clusters, similarity degrees between the images in the first sub-cluster and a new image are not calculated when a similarity degree between the new image and the first sub-cluster representative does not exceed the second threshold and a similarity degree is calculated between the new image and any next sub-cluster representative in the first direction, and when there are no remaining next sub-cluster representatives in the first direction, the method includes creating an end node that adds the new image to the tree structure.

7. The method according to claim 6, wherein at the displaying, a predefined number of images included in the first sub-cluster is displayed in descending order of similarity degrees to the first sub-cluster representative.

8. The method according to claim 6, wherein
the images includes persons,
at the classifying into the plurality of clusters, the images are classified into the plurality of clusters for the respective persons based on the similarity degrees of the persons included in the images and the first threshold, and
at the further classifying into the plurality of sub-clusters, the images are classified into the plurality of sub-clusters based on the similarity degrees of the persons included in the images and the second threshold.

9. The method according to claim 8, further comprising registering, in a person search database, one or more images selected from the display information.

10. The method according to claim 6, further comprising deleting one or more images selected from the display information or changing a cluster or a sub-cluster that includes one or more images selected from the display information.

11. A computer program product comprising a non-transitory computer-readable medium including programmed instructions, the instructions causing a computer to:
classify, based on images received, a similarity degree to an average of images included in a cluster, and a first threshold used for classification by the similarity degree, the images received into a plurality of clusters;
further classify images within each of the plurality of clusters into a plurality of sub-clusters based on the similarity degrees and a second threshold that is higher than the first threshold; and
display, on a display device, display information including a cluster representative indicative of a representative of images included in a cluster and a sub-cluster representative indicative of a representative of an image included in a sub-cluster, wherein
the cluster representative is an image that is closest to the average of the images included in the cluster among the images included in the cluster,
the sub-cluster representative is an image that is closest to an average of images included in the sub-cluster among the images included in the sub-cluster,
a plurality of images classified by the computer has a tree structure in which a sub-cluster representative with a highest similarity degree to the cluster representative serves as a root, sub-cluster representatives are connected together in a first direction in descending order of similarity degrees to the cluster representative, and images in a first sub-cluster including a first sub-cluster representative are connected together in a second direction in descending order of similarity degrees to the first sub-cluster representative, and
the instructions further cause the computer to, when classifying a new image, not calculate similarity degrees between the images in the first sub-cluster and the new image when a similarity degree between the new image and the first sub-cluster representative does not exceed the second threshold and proceed to calculate a similarity degree between the new image and any next sub-cluster representative in the first direction, and when there are no remaining next sub-cluster representatives in the first direction, create an end node that adds the new image to the tree structure.

12. The computer program product according to claim 11, wherein the instructions further cause the computer to display a predefined number of images included in the first sub-cluster in descending order of similarity degrees to the first sub-cluster representative.

13. The computer program product according to claim 11, wherein
the images includes persons,
the instructions further cause the computer to:
classify the images into the plurality of clusters for the respective persons based on the similarity degrees of the persons included in the images and the first threshold, and
further classify the images into the plurality of sub-clusters based on the similarity degrees of the persons included in the images and the second threshold.

14. The computer program product according to claim 13, wherein the instructions further cause the computer to register, in a person search database, one or more images selected from the display information.

15. The computer program product according to claim 11, wherein the instructions further cause the computer to delete one or more images selected from the display information or to change a cluster or a sub-cluster that includes one or more images selected from the display information.

* * * * *